(12) United States Patent
Park (10) Patent No.: US 12,457,538 B1
(45) Date of Patent: Oct. 28, 2025

(54) METHOD AND APPARATUS FOR REPORTING FAILURE INFORMATION (71) Applicant: Mentats Co., Ltd., Seoul (KR)

(72) Inventor: DaeHeum Park, Suwon-si (KR)

(73) Assignee: Mentats., Ltd., Seoul (KR)

( * ) Notice: Subject to any disclaimer, the term of this patent is extended or adjusted under 35 U.S.C. 154(b) by 0 days.

(21) Appl. No.: 19/184,076

(22) Filed: Apr. 21, 2025

(30) Foreign Application Priority Data

Apr. 25, 2024 (KR) .................. 10-2024-0055718

(51) Int. Cl.
*H04W 36/00* (2009.01)
*H04W 36/30* (2009.01)

(52) U.S. Cl.
CPC ................ *H04W 36/305* (2018.08)

(58) Field of Classification Search
None
See application file for complete search history.

(56) References Cited

U.S. PATENT DOCUMENTS

| 2019/0253949 | A1* | 8/2019 | Park | H04W 76/19 |
| 2023/0171655 | A1* | 6/2023 | Chen | H04W 36/00 370/331 |
| 2024/0251320 | A1* | 7/2024 | Jung | H04W 36/362 |

FOREIGN PATENT DOCUMENTS

WO   WO-2024035307 A1 *  2/2024  .......... H04W 36/249

\* cited by examiner

*Primary Examiner* — Shukri Taha
(74) *Attorney, Agent, or Firm* — Bridgeway IP Law Group, PLLC; Jihun Kim (57) ABSTRACT

Provided are a method and apparatus for reporting failure information in a wireless communication system. A terminal may transmit a terminal capability information message including at least one of connection establishment failure (CEF) parameter information and radio link failure (RLF) parameter information. Further, the terminal may receive a terminal information request message requesting at least one of a CEF report and a RLF report, and transmit a terminal information response message including at least one of the CEF report and the RLF report.

8 Claims, 6 Drawing Sheets

METHOD AND APPARATUS FOR REPORTING FAILURE INFORMATION

CROSS-REFERENCE TO RELATED APPLICATIONS

This application claims the priority of Korean Patent Application No. 10-2024-0055718 filed on Apr. 25, 2024, in the Korean Intellectual Property Office, the disclosure of which is incorporated herein by reference.

BACKGROUND OF THE DISCLOSURE

Field of the Disclosure

The present disclosure relates to a wireless communication system applicable to 4G, 5G and 6G.

Related Art

With the continuous development of mobile communication technologies, the transition from 4G to 5G has brought about significant improvements in various aspects of wireless communication. These advancements are designed to meet the ever-growing demands of modern applications, such as high-speed mobile broadband, massive connectivity for Internet of Things (IoT) devices, and ultra-reliable low-latency communications. The key areas of development in 5G can be categorized into enhanced Mobile Broadband (eMBB), massive Machine Type Communications (mMTC), and Ultra-Reliable Low-Latency Communications (URLLC), each addressing distinct use cases and requirements that were challenging for 4G technologies.

Enhanced Mobile Broadband (eMBB)

In 4G, Long-Term Evolution (LTE) technology provided high-speed mobile broadband, with peak download speeds reaching up to 1 Gbps. While this met the needs of high-definition video streaming, mobile gaming, and other data-intensive services, the increasing demand for higher speeds and larger data volumes necessitated further innovation. 5G addresses these challenges by offering up to 20 Gbps download speeds, enabling new applications such as 4K/8K video streaming, virtual reality (VR), augmented reality (AR), and large-scale data transfers. The introduction of technologies such as massive MIMO, beamforming, and the use of millimeter-wave frequencies have enabled 5G to deliver these improved capabilities, meeting the growing demand for mobile broadband.

Massive Machine Type Communications (mMTC)

The emergence of the Internet of Things (IoT) has brought about the need for a vast number of connected devices. However, 4G LTE technology was not optimized for massive device connectivity, as it primarily focused on human-to-human communication. Moreover, 4G faced limitations in terms of energy efficiency, scalability, and the ability to handle a large number of connected devices simultaneously. 5G addresses these issues by introducing mMTC, which supports the connection of millions of devices with minimal energy consumption and long battery life. By utilizing Low-Power Wide-Area Networks (LPWAN) and network slicing, 5G ensures efficient connectivity for massive IoT deployments, including smart cities, agriculture, healthcare, and other large-scale IoT ecosystems.

Ultra-Reliable Low-Latency Communications (URLLC)

4G networks, while offering low latency for mobile broadband, were not optimized for ultra-reliable and real-time communication, which is essential for applications such as autonomous driving, remote surgery, and industrial automation. The need for ultra-reliable, low-latency communication with near-instantaneous response times prompted the development of URLLC in 5G. With 5G, latency is reduced to as low as 1 millisecond, enabling real-time communication and control. This advancement is critical for applications that require immediate decision-making, such as autonomous vehicles that rely on real-time vehicle-to-vehicle and vehicle-to-infrastructure communication, as well as remote medical procedures and industrial automation systems that require precise, instantaneous control.

These developments have made 5G a pivotal technology in transforming the way industries operate and society interacts with the digital world. The ongoing evolution from 4G to 5G represents a significant leap forward in enabling new use cases, increasing network efficiency, and enhancing user experience.

Looking ahead, 6G is expected to further expand the capabilities of 5G, focusing on even higher speeds, ultra-high reliability, and the integration of advanced technologies like AI and holographic communications. It is anticipated that 6G will enable more immersive and seamless experiences, such as truly ubiquitous connectivity, advanced immersive technologies like mixed reality (XR), and autonomous systems that operate in real-time with zero latency. The evolution from 4G to 5G and eventually to 6G highlights the continuous progress in wireless communication technologies and their increasing role in shaping the future of the digital world.

SUMMARY OF THE DISCLOSURE

The disclosure is to provide a method and apparatus for efficiently reporting failure information in a wireless communication system.

According to an embodiment, a method of a terminal may be provided for transmitting a terminal capability information message including at least one of connection establishment failure (CEF) parameter information and radio link failure (RLF) parameter information. The method of the terminal may further include receiving a terminal information request message requesting at least one of a CEF report and an RLF report, and transmitting a terminal information response message including at least one of the CEF report and the RLF report.

According to another embodiment, a terminal may be provided for operating in a wireless communication system. The terminal may include a processor configured to cause the terminal to transmit a terminal capability information message including at least one of connection establishment failure (CEF) parameter information and radio link failure (RLF) parameter information. The processor is further configured to cause the terminal to receive a terminal information request message requesting at least one of a CEF report and an RLF report, and transmit a terminal information response message including at least one of the CEF report and the RLF report.

The CEF parameter information may indicate whether the terminal supports the CEF report in the terminal information response message. The RLF parameter information may indicate whether the terminal supports the RLF report in the terminal information response message.

The terminal may receive a terminal capability enquiry message before transmitting the terminal capability information message.

The terminal may generate at least one of the CEF report and the RLF report after receiving the terminal information request message.

The terminal may select a cell, and consider the cell as an acceptable cell based on barring exemption information. Here, the barring exemption information is received through a system information block 1 (SIB1).

Meanwhile, the CEF parameter information may further indicate whether the terminal supports storage of CEF information or connection resume failure information. The RLF parameter information may further indicate whether the terminal supports storage of RLF information or handover failure information.

DESCRIPTION OF EXEMPLARY EMBODIMENTS

The technical terms used in this disclosure are intended to describe specific embodiments and should not be construed as limiting. Unless otherwise defined, these terms should be interpreted according to their generally understood meanings by those skilled in the art, without being overly broad or narrow. If a term does not fully represent the spirit of the disclosure, it should be understood as the most accurate technical term recognized by those skilled in the art.

The use of a slash (/) or a comma in the present disclosure may represent "and/or." For example, "A/B" may indicate "A and/or B," meaning it can refer to "only A," "only B," or "both A and B.".

Figure 1:
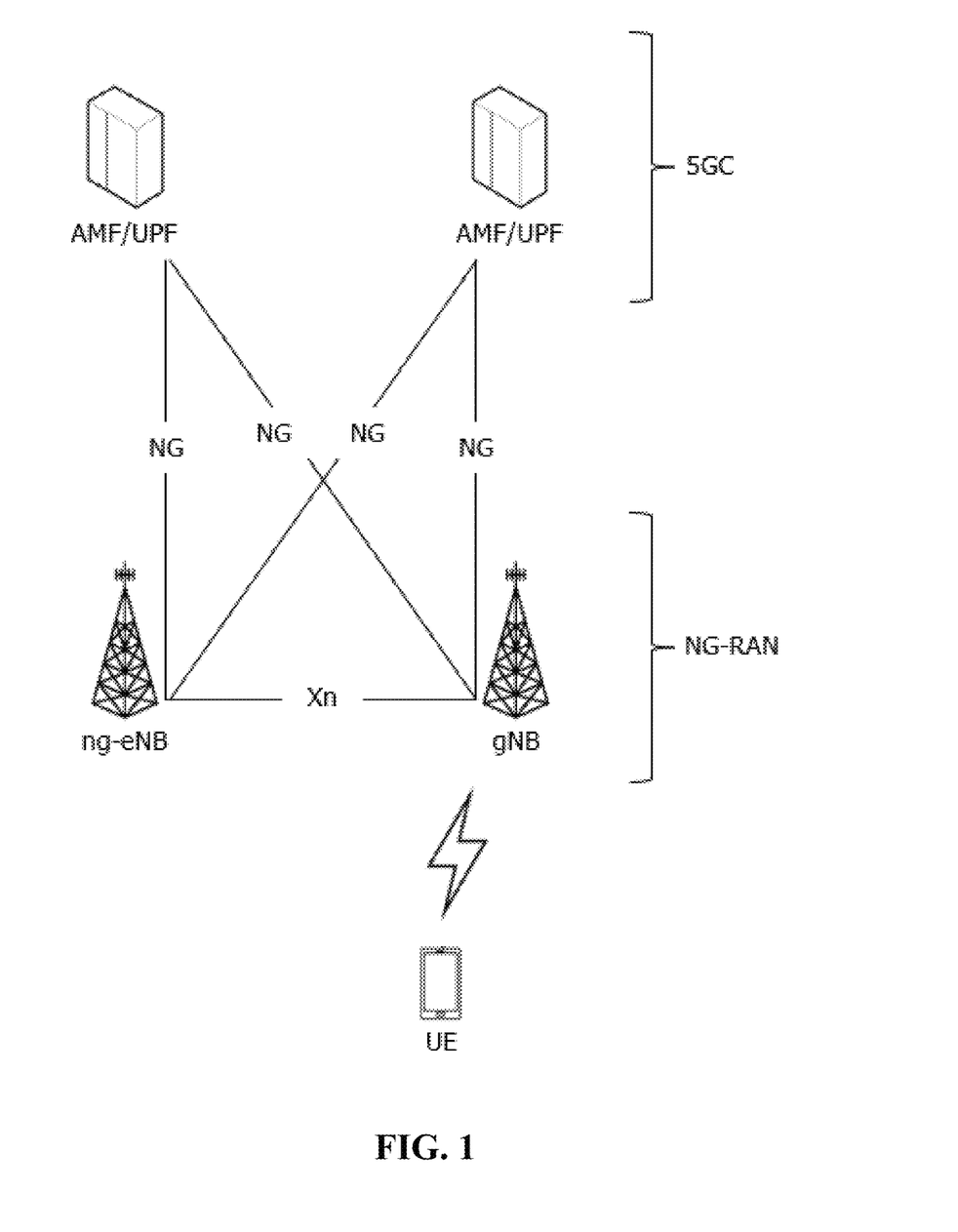
FIG. 1 illustrates a wireless communication system.

FIG. 1 illustrates a wireless communication system.

Referring to FIG. 1, the wireless communication system may be classified into a 5G core network (5GC) and a next generation-radio access network (NG-RAN), and the NG-RAN may include a base station (gNB and/or ng-eNB) that provides user plane and control plane protocol termination to a terminal (user equipment, UE). A next generation-Node B (gNB) provides an NR user plane and control plane protocol termination to the terminal, and a next generation-evolved node B (ng-eNB) provides an evolved-universal terrestrial radio access (E-UTRA) user plane and control plane protocol termination to the terminal (UE). The terminal (UE) may be fixed or mobile, and may be referred to as another term such as a mobile station (MS), a user terminal (UT), a subscriber station (SS), a mobile terminal (MT), a wireless device, etc. The base station (gNB and/or ng-eNB) may be a fixed station communicating with the terminal (UE), and may be referred to as another term such as a base transceiver system (BTS), an access point, etc.

The base station (gNB and/or ng-eNB) may be connected to each other through an Xn interface, and may be connected to a 5G core network (5GC) through an NG interface. Specifically, the base station (gNB and/or ng-eNB) may be connected to an access and mobility management function (AMF) through an NG-C interface, and may be connected to a user plane function (UPF) through an NG-U interface.

Figure 2:
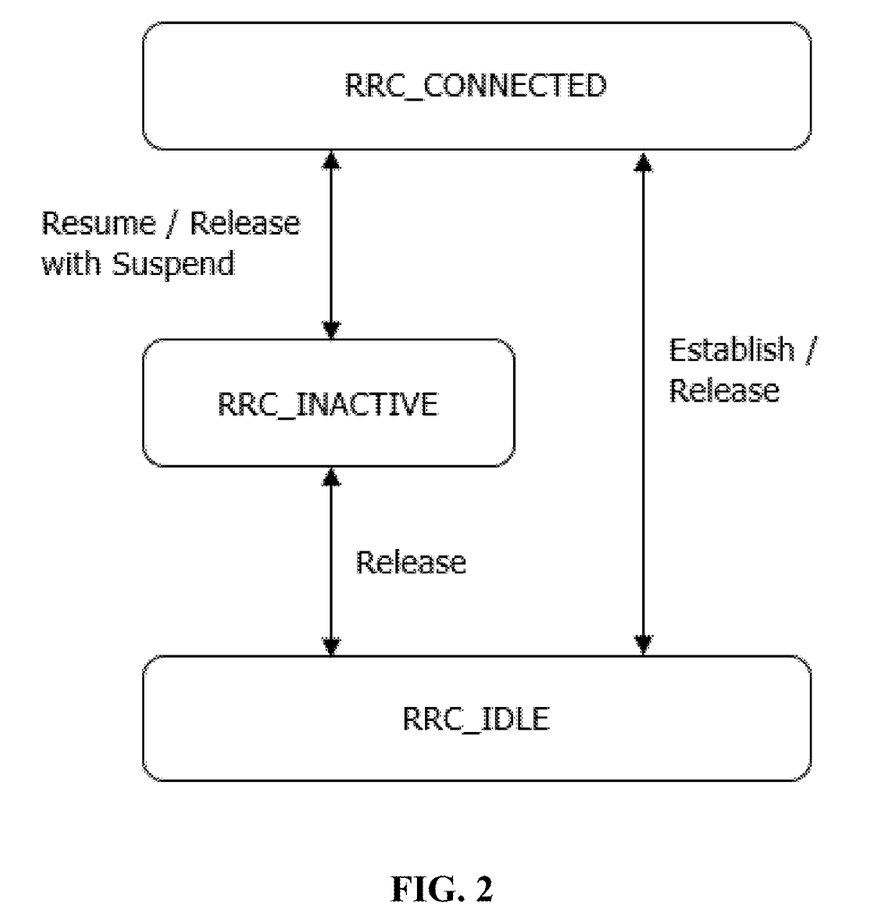
FIG. 2 illustrates UE state machine and state transitions in NR.

FIG. 2 illustrates UE state machine and state transitions in NR.

A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:

1. RRC_IDLE:
   A UE specific DRX (Discontinuous Reception) may be configured by upper layers;
   At lower layers, the UE may be configured with a DRX for PTM (Point to Multipoint) transmission of MBS (Multicast/Broadcast Services) broadcast;
   UE controlled mobility based on network configuration;
   The UE:
   i) Monitors Short Messages transmitted with P-RNTI (Paging-RNTI) over DCI (Downlink Control Information);
   ii) Monitors a Paging channel for CN (Core Network) paging using 5G-S-TMSI (5G-Serving-Temporary Mobile Subscriber Identity), except if the UE is acting as a L2 (Layer 2) U2N (UE-to-Network) Remote UE;
   iii) If configured by upper layers for MBS multicast reception, monitors a Paging channel for CN paging using TMGI (Temporary Mobile Group Identity);
   iv) Performs neighbouring cell measurements and cell (re-) selection;
   v) Performs measurements on L2 U2N Relay UEs and relay (re-) selection;
   vi) Acquires system information and can send SI request (if configured);
   vii) Performs logging of available measurements together with location and time for logged measurement configured UEs;
   viii) Performs idle/inactive measurements for idle/inactive measurement configured UEs;
   ix) If configured by upper layers for MBS broadcast reception, acquires MCCH change notification and MBS broadcast control information and data.

Figure 3:
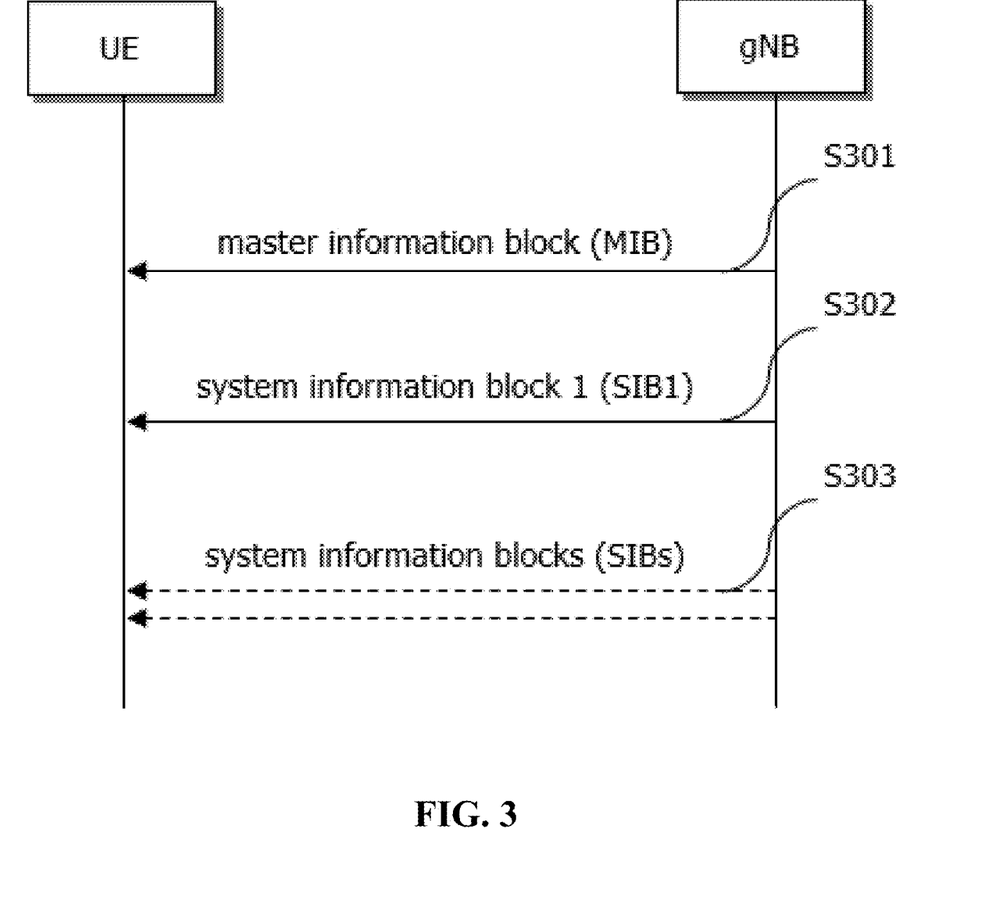
FIG. 3 illustrates a procedure of system information acquisition.

2. RRC_INACTIVE:
   A UE specific DRX may be configured by upper layers or by RRC layer;
   At lower layers, the UE may be configured with a DRX for PTM transmission of MBS broadcast and/or a DRX for PTM transmission of MBS multicast;
   UE controlled mobility based on network configuration;
   The UE stores the UE Inactive AS (Access Stratum) context;
   A RAN-based notification area is configured by RRC layer;
   Transfer of unicast data and/or signalling to/from UE over radio bearers configured for SDT.
   The UE:
   i) Monitors Short Messages transmitted with P-RNTI over DCI;
   ii) While T319a is running, monitors control channels associated with the shared data channel to determine if data is scheduled for it;
   iii) While T319a is not running, monitors a Paging channel for CN paging using 5G-S-TMSI and RAN paging using fullI-RNTI (full Inactive RNTI), except if the UE is acting as a L2 U2N Remote UE;
iv) If configured by upper layers for MBS multicast reception, while T319a is not running, monitors a Paging channel for paging using TMGI;
v) Performs neighbouring cell measurements and cell (re-) selection;
vi) Performs measurements on L2 U2N Relay UEs and relay (re-) selection;
vii) Performs RAN-based notification area updates periodically and when moving outside the configured RAN-based notification area;
viii) Acquires system information and, while SDT (Small Data Transmission) procedure is not ongoing, can send SI (System Information) request (if configured);
ix) While SDT procedure is not ongoing, performs logging of available measurements together with location and time for logged measurement configured UEs;
x) While SDT procedure is not ongoing, performs idle/inactive measurements for idle/inactive measurement configured UEs;
xi) If configured by upper layers for MBS broadcast reception, acquires MCCH (MBS Control Channel) change notification and MBS broadcast control information and data;
xii) If configured for MBS multicast reception in RRC_INACTIVE, acquires multicast MCCH change notification and MBS multicast control information and data;
xiii) Transmits SRS (Sounding Reference Signal) for Positioning.
3. RRC_CONNECTED:
The UE stores the AS context;
Transfer of unicast data to/from UE;
Transfer of MBS multicast data to UE;
At lower layers, the UE may be configured with a UE specific DRX;
At lower layers, the UE may be configured with a DRX for PTM transmission of MBS broadcast and/or a DRX for MBS multicast;
At lower layers, the UE may be configured with a cell specific cell DTX/DRX;
For UEs supporting CA (Carrier Aggregation), use of one or more SCells (Secondary Cells), aggregated with the SpCell (Special Cell), for increased bandwidth;
For UEs supporting DC (Dual Connectivity), use of one SCG (Secondary Cell Group), aggregated with the MCG (Master Cell Group), for increased bandwidth;
Network controlled mobility within NR, to/from E-UTRA, and to UTRA-FDD;
Network controlled mobility (path switch) between a serving cell and a L2 U2N Relay UE, or vice versa, or between a source L2 U2N Relay UE and a target L2 U2N Relay UE;
Network controlled MP (Multi-Path) operation.
The UE:
i) Monitors Short Messages transmitted with P-RNTI over DCI, if configured;
ii) Monitors control channels associated with the shared data channel to determine if data is scheduled for it;
iii) Provides channel quality and feedback information;
iv) Performs neighbouring cell and/or L2 U2N relay measurements and measurement reporting;
v) Acquires system information;
vi) Performs immediate MDT measurement together with available location reporting;
vii) If configured by upper layers for MBS broadcast reception, acquires MCCH change notification and MBS broadcast control information and data FIG. 3 illustrates a procedure of system information acquisition.

System Information (SI) may be divided into a master information block (MIB), a system information block 1 (SIB1) and a number of SIBs. The MIB contains cell barred status information and essential physical layer information of the cell required to receive further system information. The MIB is always transmitted on the broadcast channel (BCH) periodically (S301). The SIB1 defines the scheduling of other system information blocks and contains information required for initial access. The SIB1 is also referred to as Remaining Minimum SI (RMSI) and is periodically broadcast on downlink shared channel (DL-SCH) or sent in a dedicated manner on DL-SCH to UEs in RRC_CONNECTED (S302). The SIBs can either be periodically broadcast on DL-SCH, broadcast on-demand on DL-SCH or sent in a dedicated manner on DL-SCH to UEs in RRC_CONNECTED (S303).

Figure 4:
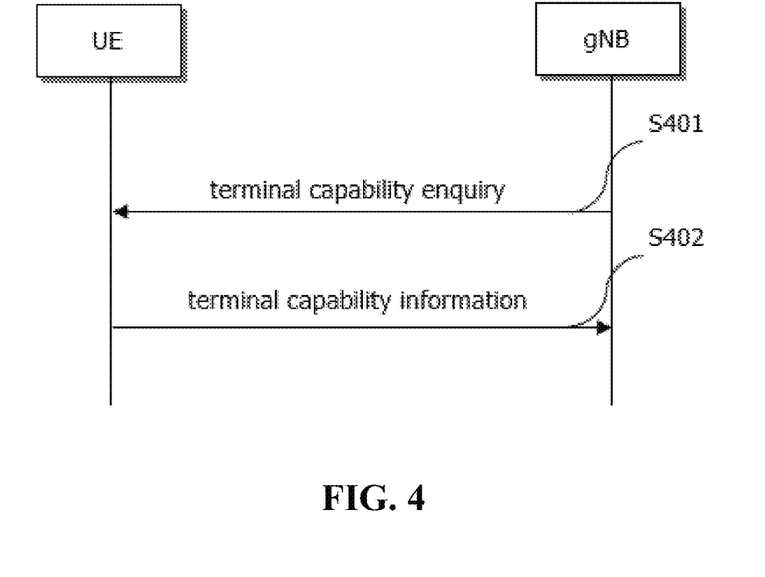
FIG. 4 illustrates a procedure of terminal capability transfer.

FIG. 4 illustrates a procedure of terminal capability transfer.

The base station (gNB) may initiate the procedure to a terminal (UE) in RRC_CONNECTED when it needs (additional) UE radio access capability information. The base station should retrieve terminal (UE) capabilities only after access stratum (AS) security activation. The base station may not forward terminal (UE) capabilities that were retrieved before AS security activation to the core network (CN). Referring to FIG. 4, a terminal (UE) capability enquiry message is transmitted to request terminal (UE) radio access capabilities for NR as well as for other radio access technologies (S401). The terminal (UE) capability information message is transmitted to transfer terminal (UE) radio access capabilities requested by the base station (S402).

Figure 5:
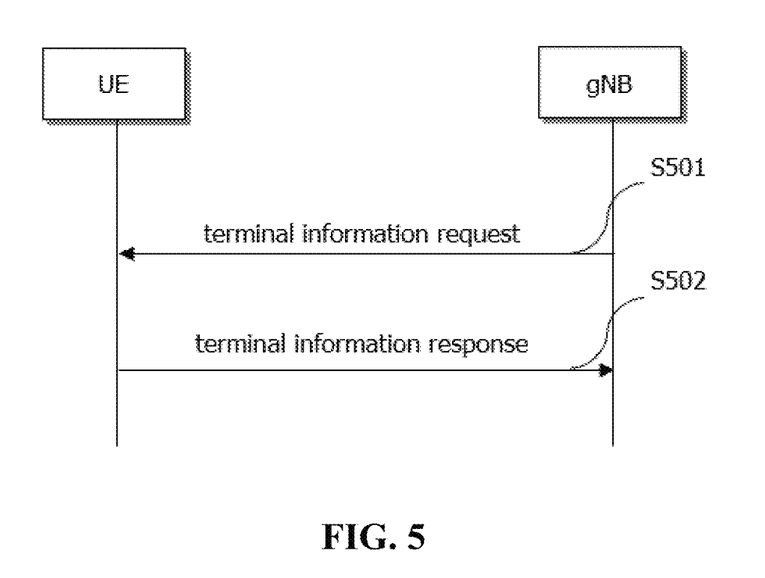
FIG. 5 illustrates a procedure related to terminal information.

FIG. 5 illustrates a procedure related to terminal information.

The terminal (UE) information procedure is used by the base station (gNB) to request the terminal to report information. The base station initiates the procedure by sending the terminal (UE) information request message. The base station should initiate this procedure only after successful security activation. Referring to FIG. 5, a terminal (UE) information request message is transmitted to retrieve information from the terminal (S501). The terminal information response message is used by the terminal to transfer information requested by the base station (S502).

<Reduced Capability (RedCap) and Enhanced Reduced Capability (eRedCap) NR Devices>

A RedCap UE has reduced capabilities with the intention to have lower complexity with respect to non-RedCap UEs. It is mandatory for a RedCap UE to support 20 MHz maximum UE channel bandwidth in FR1 and 100 MHz in FR2. An eRedCap UE has further reduced capabilities with the intention to have lower complexity with respect to RedCap UEs. It is mandatory for an eRedCap UE to support reduced DL/UL peak data rate of 10 Mbps, with or without reduced baseband bandwidth of 5 MHz for unicast physical downlink shared channel (PDSCH)/physical uplink shared channel (PUSCH) in FR1.

A RedCap UE can be identified by the network during Random Access procedure via MSG3 (message 3)/MSGA (message A) from a RedCap specific LCID (Logical Channel ID) (s) and optionally via MSG1/MSGA (PRACH occasion or PRACH preamble). An eRedCap UE may be identified by the network during Random Access procedure via MSG3/MSGA from an eRedCap specific LCID(s) and optionally via MSG1. For RedCap UE identification via MSG1/MSGA, RedCap specific Random Access configuration may be configured by the network. For eRedCap UE identification via MSG1, eRedCap specific Random Access configuration may be configured by the network. For MSG3/MSGA, an (e) RedCap UE is identified by the dedicated LCID(s) indicated for common control channel (CCCH) identification (CCCH or CCCH1) regardless whether (e) RedCap specific Random Access configuration is configured by the network.

(e) RedCap UEs with 1 Rx branch and 2 Rx branches can be allowed separately via system information. In addition, (e) RedCap UEs in Half-Duplex FDD mode can be allowed via system information. A RedCap specific initial frequency restriction information (IFRI) can be provided in SIB1, when absent, RedCap UEs access is not allowed. An eRedCap specific IFRI can be provided in SIB1, when absent, eRedCap UEs access is not allowed. Information on which frequencies (e) RedCap UE access is allowed can be provided in system information.

Meanwhile, a UE cannot make an emergency call if a cell is barred. A network may allow access for RedCap UEs in the cell but may bar those UEs depending on whether the RedCap UE uses 1Rx or 2Rx branches.

If the cell allows access for RedCap UEs but those UEs consider the cell barred based on 1Rx or 2Rx support, or both, it may be beneficial to introduce an exception allowing them to access the cell for making emergency calls or receiving emergency information broadcasts, when possible, if the cell permits RedCap UE access.

The present invention introduces a mechanism that allows RedCap UEs to access the cell for making emergency calls or receiving emergency information broadcasts, when possible, if the cell permits RedCap UE access but those UEs consider the cell barred based on 1Rx or 2Rx support. The following logic may be added to the UE cell selection/reselection procedure:

If the cell supports RedCap UEs and is not barred for any reason except for barring RedCap UEs solely due to 1Rx or 2Rx support, then the RedCap UE may consider this cell acceptable (e.g., for emergency calls), provided that the cell allows it through the relevant SIB1.

Further, for the purposes of self-organizing network (SON), connection establishment failure (CEF) and radio link failure (RLF) information reporting were implemented without capability signaling. However, the RedCap UE feature was introduced later, so these CEF and RLF reporting features should be considered as mandatory for RedCap UEs. However, for RedCap UEs, some may support CEF and RLF reporting features, while others may not. Therefore, capability signaling for CEF and RLF reporting features is required for RedCap UEs.

Figure 6:
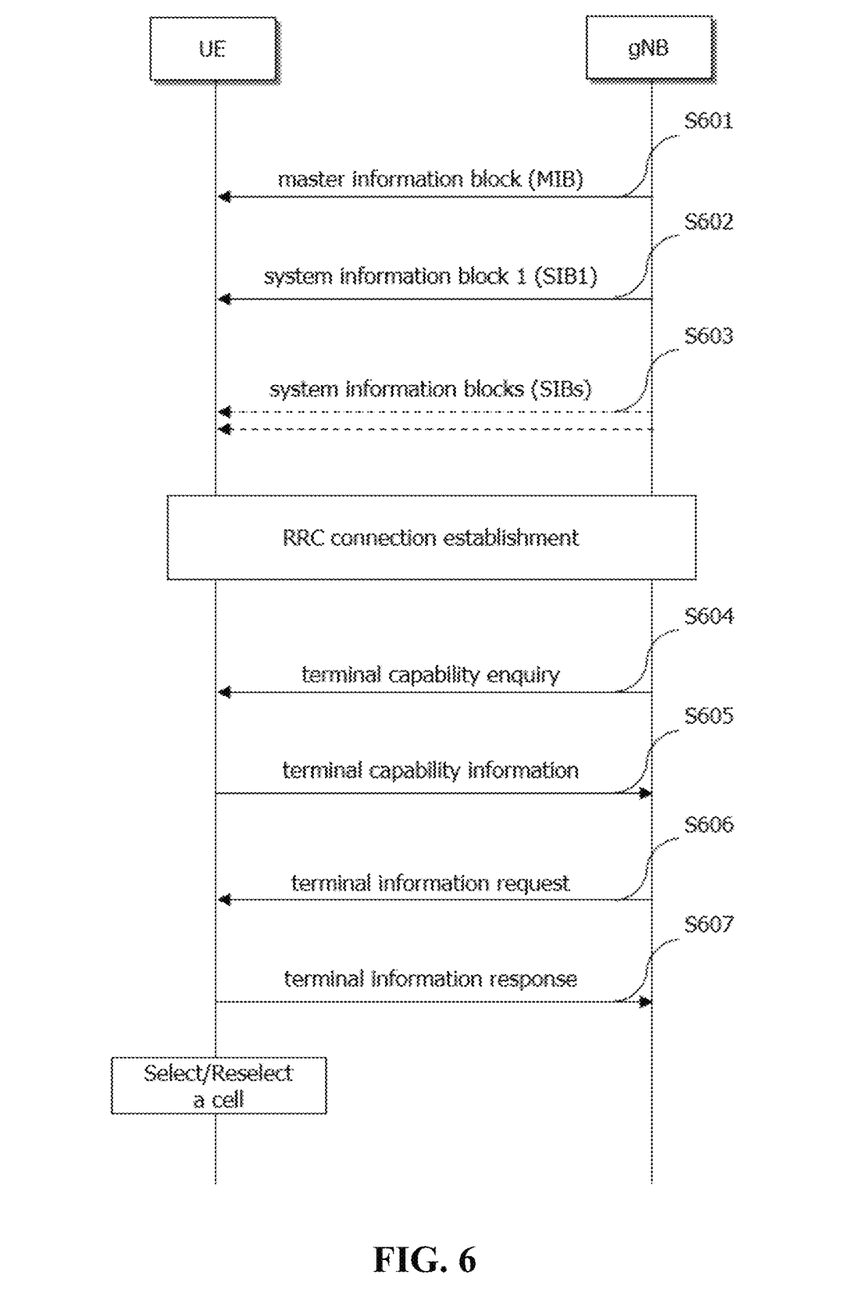
FIG. 6 illustrates a procedure between a terminal and a base station according to an embodiment of the disclosure.

FIG. 6 illustrates a procedure between a terminal and a base station according to an embodiment of the disclosure.

Referring to FIG. 6, a terminal acquires system information. That is, the terminal receives a master information block (MIB), a system information block 1 (SIB1), and optionally other system information blocks (SIBs) from a base station (S601-S603). A radio resource control (RRC) connection is established between the terminal and the base station based on the system information.

After the RRC connection is established, the base station may initiate at least one of a terminal capability transfer procedure and a terminal information procedure. The terminal capability transfer procedure and the terminal information procedure may be performed independently.

The base station may initiate the terminal capability transfer procedure to a terminal in RRC_CONNECTED when terminal radio access capability information is needed. That is, the base station may transmit a terminal capability enquiry message to request terminal radio access capabilities for NR as well as for other radio access technologies (S604). Then, the terminal may respond with a terminal capability information message to provide terminal radio access capabilities requested by the base station (S605). Under certain conditions, the terminal capability information message may be transmitted without prior reception of the terminal capability enquiry message. The terminal capability information may be associated with self-organizing network (SON) parameters. Here, the SON parameters may comprise a first parameter related to connection establishment failure (CEF) and a second parameter related to radio link failure (RLF). The first parameter (information) indicates whether the terminal supports the storage of connection establishment failure or connection resume failure information and reporting in a terminal information response (UEInformationResponse) message. The second parameter (information) indicates whether the terminal supports the storage of radio link failure information or handover failure information and reporting in the terminal information response (UEInformationResponse) message. In other words, the terminal capability information may be transmitted to the base station, including the first parameter information related to CEF and the second parameter information related to RLF.

Meanwhile, the base station may initiate the terminal information procedure by sending a terminal information request message to retrieve information from the terminal in RRC_CONNECTED (S606). The terminal may then transmit a terminal information response message to provide the information requested by the base station (S607). The terminal information request message may be used to request at least one of a CEF report and an RLF report from the terminal. In response, the terminal information response message may be transmitted including at least one of the CEF report and the RLF report. At least one of the CEF report and the RLF report may be generated upon receiving the terminal information request message. The generation of the CEF/RLF report(s) may refer to setting the CEF/RLF report(s) in the terminal information response message.

Due to terminal mobility, a state transition from RRC_CONNECTED to RRC_IDLE may occur, upon which the terminal may initiate cell selection or cell reselection procedures. For example, when degraded radio link quality is detected or anticipated for the terminal in RRC_CONNECTED, the base station may transmit an RRC release message including redirected carrier information to release the connection. The RRC release message may provide information on frequencies or cells that the terminal should prioritize during cell selection after transitioning to RRC_IDLE. Upon receiving the RRC release message, the terminal attempts to find a suitable cell based on the provided redirection information. If a suitable cell is found, the terminal camps on it. If no suitable cell is found, the terminal may continue searching on other frequencies or radio access technologies (RATs) as specified. When no suitable cell is available, the terminal may camp on an acceptable cell under the 'any cell selection' condition. This procedure allows the terminal to ensure service continuity, especially for critical services such as emergency calls, even after a connection release due to deteriorating radio conditions.

Once the terminal selects a cell, the terminal receives system information. The terminal may consider the cell as an acceptable cell based on the received system information. Specifically, the terminal may consider the cell as an acceptable cell based on barring exemption information received through a system information block 1 (SIB1). The barring exemption information may indicate that the cell allows an emergency service. The emergency service may comprise an emergency call or emergency information broadcast.

The terminal may consider the cell as an acceptable cell further based on first barring information received through a master information block (MIB) and second barring information received through the SIB1. The first barring information may indicate that the cell is not barred, and the second barring information may indicate that the cell is barred. The second barring information may be terminal-specific.

The acceptable cell may support earthquake and tsunami warning system (ETWS) and commercial mobile alert system (CMAS) notifications.

Meanwhile, the barring exemption information may further indicate an allowance time (i.e., period or duration) for the emergency service. Upon expiration of the allowance time, the terminal may consider the cell as barred.

The terminal described above may be an (e) RedCap UE.

The disclosure described so far may be implemented through various means. For example, the embodiment may be implemented by hardware, firmware, software, or a combination thereof. Specifically, the implementation will be described below with reference to the accompanying drawing.

Figure 7:
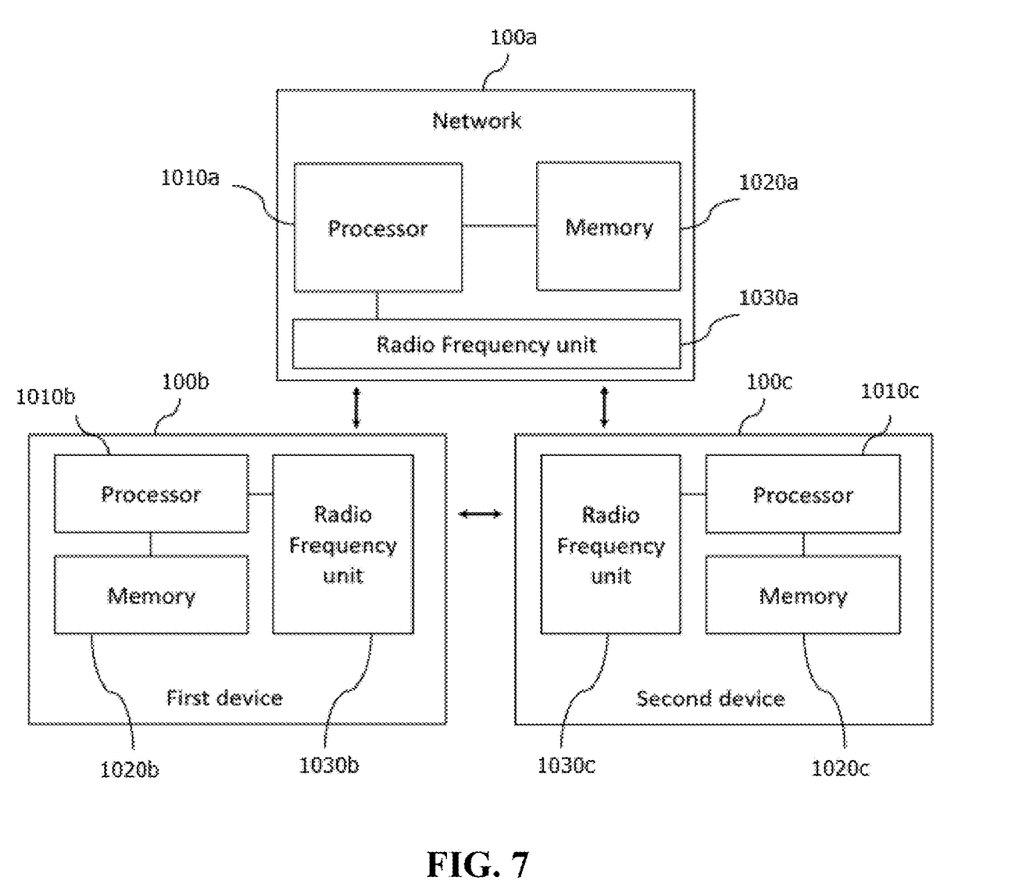
FIG. 7 is a block diagram showing apparatuses according to an embodiment of the disclosure.

FIG. 7 is a block diagram showing apparatuses according to an embodiment of the disclosure.

Referring to FIG. 7, a wireless communication system may include a network 100a, a first apparatus 100b and a second apparatus 100c.

The network 100a may include a base station, a network node, an apparatus related to 5G service, or other apparatuses related to the fourth industrial revolution.

The first device 100b may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The second device 100c may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The network 100a may include at least one processor such as a processor 1010a, at least one memory such as a memory 1020a and at least one radio frequency unit such as a radio frequency unit 1030a. The processor 1010a may be tasked with executing the previously mentioned functions, procedures, and/or methods. The processor 1010a may be capable of implementing one or more protocols. For example, the processor 1010a may perform and manage one or more layers of a radio interface protocol. The memory 1020a may be connected to the processor 1010a, and configured to store various types of information and/or instructions. The radio frequency unit 1030a may be connected to the processor 1010a, and controlled to transceive radio signals.

The first device 100b may include at least one processor such as a processor 1010b, at least one memory such as a memory 1020b and at least one radio frequency unit such as a radio frequency unit 1030b. The processor 1010b may be tasked with executing the previously mentioned functions, procedures, and/or methods. The processor 1010b may be capable of implementing one or more protocols. For example, the processor 1010b may perform and manage one or more layers of a radio interface protocol. The memory 1020b may be connected to the processor 1010b, and configured to store various types of information and/or instructions. The radio frequency unit 1030b may be connected to the processor 1010b, and controlled to transceive radio signals.

The second device 100c may include at least one processor such as a processor 1010c, at least one memory such as a memory 1020c and at least one radio frequency unit such as a radio frequency unit 1030c. The processor 1010c may be tasked with executing the previously mentioned functions, procedures, and/or methods. The processor 1010c may be capable of implementing one or more protocols. For example, the processor 1010c may perform and manage one or more layers of a radio interface protocol. The memory 1020c may be connected to the processor 1010c, and configured to store various types of information and/or instructions. The radio frequency unit 1030c may be connected to the processor 1010c, and controlled to transceive radio signals.

The memory 1020a, the memory 1020b and/or the memory 1020c may be respectively connected inside or outside the processor 1010a, the processor 1010b and/or the processor 1010c and connected to other processors through various technologies such as wired or wireless connection.

According to the embodiment of the disclosure, efficient reporting of failure information may be performed in a wireless communication system.

Although the preferred embodiments of the disclosure have been illustratively described, the scope of the disclosure is not limited to only the specific embodiments, and the disclosure can be modified, changed, or improved in various forms within the spirit of the disclosure and within a category written in the claim.

In the above exemplary systems, although the methods have been described in the form of a series of steps or blocks, the disclosure is not limited to the sequence of the steps, and some of the steps may be performed in different order from other or may be performed simultaneously with other steps. Further, those skilled in the art will understand that the steps shown in the flowcharts are not exclusive and may include other steps or one or more steps of the flowcharts may be deleted without affecting the scope of the disclosure.

Claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

What is claimed is:

1. A method for a terminal to operate in a wireless communication system, the method comprising:
    transmitting a terminal capability information message including connection establishment failure (CEF) parameter information;
    receiving a terminal information request message requesting a CEF report; and
    transmitting a terminal information response message including the CEF report,
    wherein the CEF parameter information indicates whether the terminal supports the CEF report in the terminal information response message,
    the method further comprising:
    selecting a cell; and
    considering the cell as an acceptable cell based on barring exemption information,
    wherein the barring exemption information is received through a system information block 1 (SIB1), and
    wherein the barring exemption information indicates that the cell allows an emergency service.

2. The method of claim 1, further comprising:
    receiving a terminal capability enquiry message before transmitting the terminal capability information message.

3. The method of claim 2, further comprising:
    generating the CEF report after receiving the terminal information request message.

4. The method of claim 1, wherein the CEF parameter information further indicates whether the terminal supports storage of CEF information or connection resume failure information.

5. A terminal in a wireless communication system comprising:
    a processor configured to cause the terminal to:
    transmit a terminal capability information message including connection establishment failure (CEF) parameter information;
    receive a terminal information request message requesting a CEF report; and
    transmit a terminal information response message including the CEF report,
    wherein the CEF parameter information indicates whether the terminal supports the CEF report in the terminal information response message,
    wherein the processor is further configured to cause the terminal to:
    select a cell; and
    consider the cell as an acceptable cell based on barring exemption information,
    wherein the barring exemption information is received through a system information block 1 (SIB1), and
    wherein the barring exemption information indicates that the cell allows an emergency service.

6. The terminal of claim 5, wherein the processor is further configured to cause the terminal to:
    receive a terminal capability enquiry message before transmitting the terminal capability information message.

7. The terminal of claim 6, wherein the processor is further configured to cause the terminal to:
    generate the CEF report after receiving the terminal information request message.

8. The terminal of claim 5, wherein the CEF parameter information further indicates whether the terminal supports storage of CEF information or connection resume failure information.

* * * * *